July 20, 1965   A. MELROSE   3,195,737
APPARATUS FOR SEPARATING INDIVIDUAL BILLETS FROM BUNDLES
Filed May 29, 1962   6 Sheets-Sheet 1
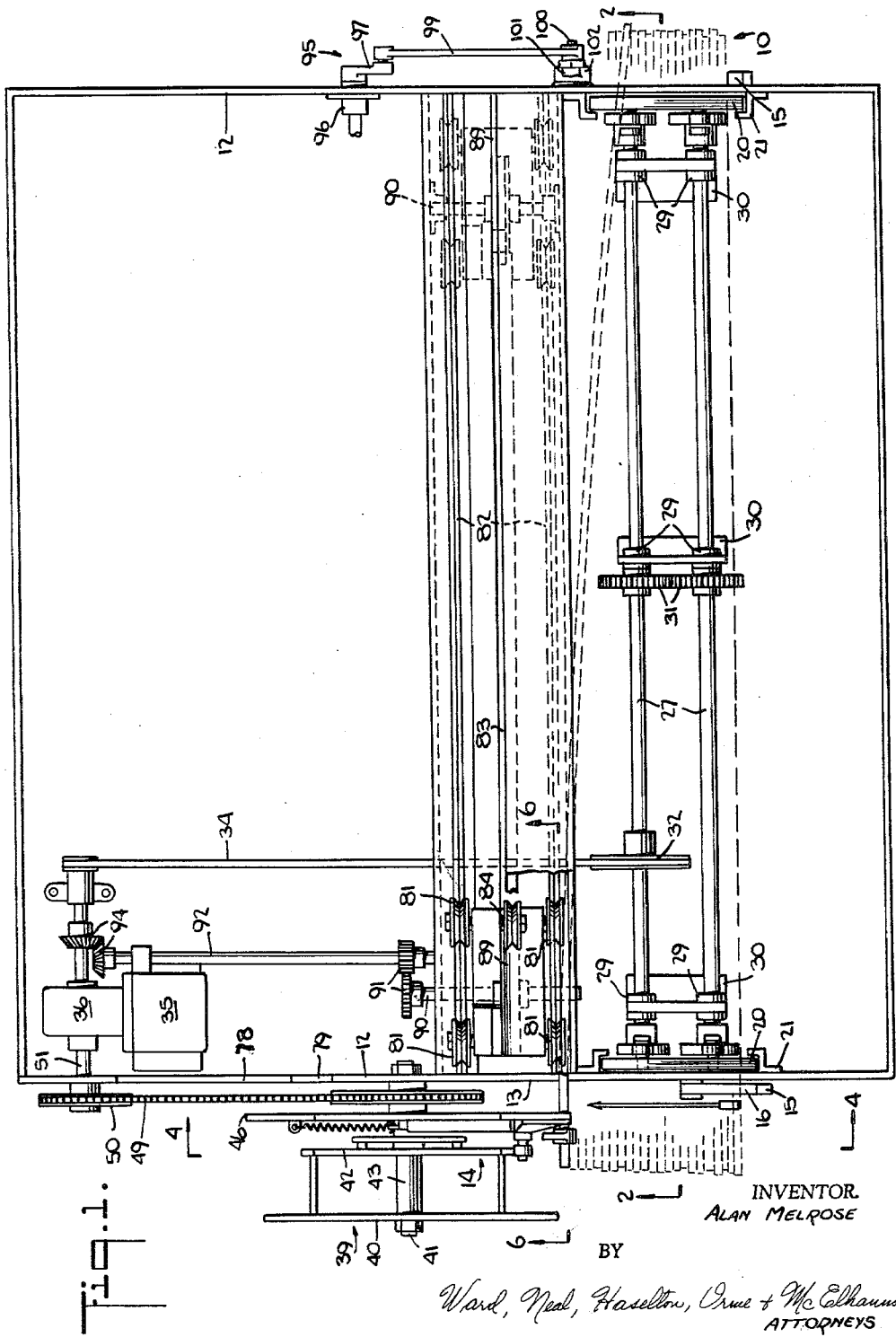
INVENTOR.
ALAN MELROSE
BY
Ward, Neal, Haselton, Orme & McElhannon
ATTORNEYS July 20, 1965        A. MELROSE        3,195,737
APPARATUS FOR SEPARATING INDIVIDUAL BILLETS FROM BUNDLES
Filed May 29, 1962        6 Sheets-Sheet 2
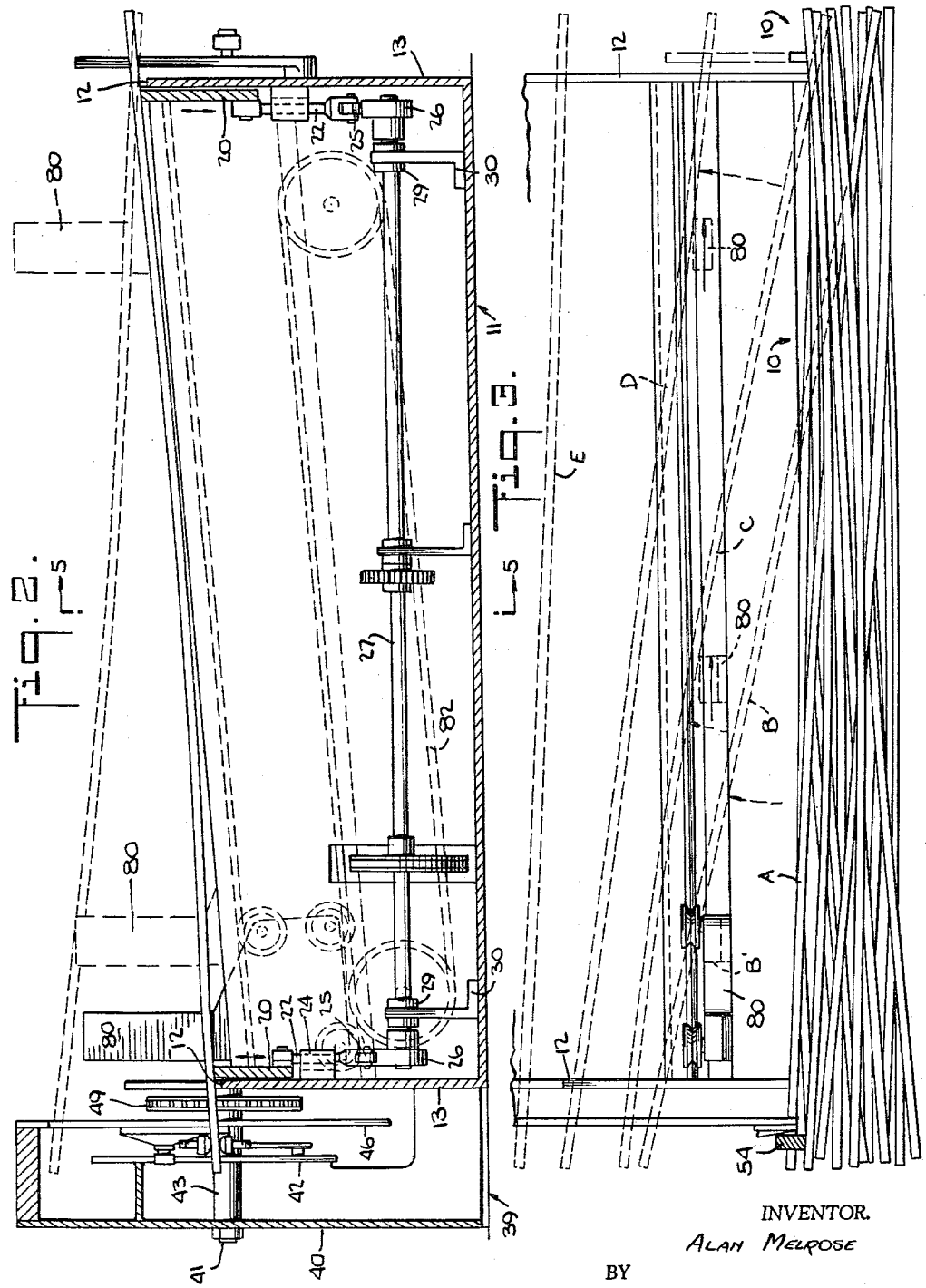
INVENTOR.
ALAN MELROSE
BY
Ward, Neal, Haselton, Orme & McElhannon
ATTORNEYS

INVENTOR.
ALAN MELROSE

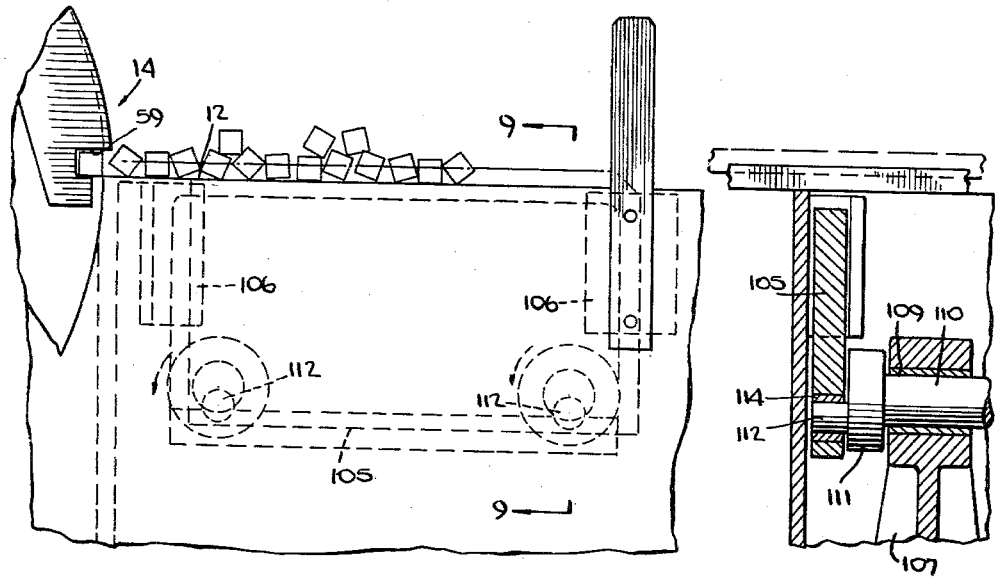

United States Patent Office 3,195,737
Patented July 20, 1965

3,195,737
APPARATUS FOR SEPARATING INDIVIDUAL BILLETS FROM BUNDLES
Alan Melrose, Brooklyn, N.Y., assignor to Burns & Roe Inc., New York, N.Y., a corporation of New Jersey
Filed May 29, 1962, Ser. No. 198,623
6 Claims. (Cl. 214—1)

This invention relates to apparatus for handling elongate rods, bars or the like, and more particularly, to such apparatus for acting upon a bundle of random arranged billets to unravel or unscramble and separate the billets for presentation individually at an inspection station, for example. The problem of handling billets will be appreciated when it is realized a single billet 1¾" square and 32' long weighs approximately 330 lbs.

Heretofore, to unscramble or separate billets from a bundle, numerous expedients have been proposed. Thus, it is known to utilize walking beams comprising sets of stationary skids or rails and adjacent sets of movable skids or rails, the latter being driven in an eccentric path so as to be at times above and at times below the level of the stationary members while having a lateral translation relatively thereto so as to walk billets or the like extending thereacross in one direction longitudinally of the skids while at the same time imparting a vibration or jounce thereto. In such apparatus, both the stationary and movable members were formed with step-like drops to topple billets on the high end towards the low end as a result of the walking action. Meanwhile, an operator could control rotation in either direction of a cross-shaft having fingers thereon that could be positioned ahead of the billets to square up a bundle, or between billets to separate them. The movable skids could be reversed when desired to straighten billets out by walking them backwards against the riser or step behind them.

Apparatus of this type proved ineffective, slow and dangerous to workmen, and other apparatus was subsequently proposed. Thus, machines were devised wherein billets were dropped from one to another of a series of drums positioned at successively lower levels and driven at successively slower speeds. It has also been proposed to utilize pairs of adjacent stepped skids for supporting the billets transversely thereof and then cascading the billets down the steps by a slow forward and quick return motion imparted to one pair of skids relatively to its adjacent pair, with succeeding pairs of skids imparting progressively slower speeds to the articles as they advance towards the delivery end of the apparatus.

Investigations have been conducted into the use of vibrators, bumpers, hoppers and various forms of walking beams, all of which, along with the foregoing proposed apparatus have proven inadequate primarily because of the large degree of camber in the billets. The camber may be of the order of 18" in billets as long as 32' for example; and excessive handling of a bundle of billets having any appreciable camber by some of the aforementioned apparatus has been known actually to aggravate the scrambled or raveled condition of the bundle. It will also be appreciated that camber in the billets presents a further difficulty in that a severe camber may very well cause a billet to whip if, during handling, one end thereof becomes free while the other end remains under restraint in the bundle.

In application for United States Letters Patent Serial No. 130,436 of Robert A. Chapellier, filed August 9, 1961, now Patent No. 3,144,139 and entitled "Billet Handling Apparatus" there is described an effective solution to the problems presented utilizing a multiple combing principle which provides positive bundle splitting and which breaks down the bundle in several sequential combing operations, each operation splitting the bundle into pairs of smaller bundles, until eventually individual billets are presented.

While the contribution described in the foregoing application is commercially desirable, I have conceived by my invention, an effective apparatus for separating individual billets from a bundle in a single step operation, without the necessity of sequential combing operations.

In essence, my invention resides in the utilization of spaced, horizontal support means for supporting thereacross a bundle of billets to be separated, and transfer means positioned intermediate the ends of the billets, and including means receiving individually billets in the bundle and operable to shift same from the bundle towards an advanced position on the support means, and means shiftable transversely of the billet support means in timed relation to the movement of the transfer means to comb a billet received by the transfer means out of the bundle. Actually, the support means are preferably a pair of spaced, parallel rails which are shiftable laterally relatively to one another so as to be able to accept bundles of billets of varying lengths.

The transfer means is preferably mounted on one of the rails so as to be in a position to engage the billets intermediate their ends, but adjacent one of the ends. The transfer means may comprise a member formed, with a notch or recess for the reception therein of individual billets in the bundle, and means are provided pivoting the billet receiving member so that it describes an arc moving in the direction in which the billets are to be advanced. Actually, the billet receiving member is preferably a part of a rotating disc, and means such as a cam and follower are provided for shifting the member radially to project and retract it in timed relation to its pivoting movement. Thus, the member is projected to receive a billet and is retracted to release the billet after it has described a portion of its pivotal movement so as to advance the billet in the desired direction.

As has been mentioned, the transfer means is positioned adjacent an end of the bundle of billets so that while the operation as thus far described may serve to advance an end of an individual billet, it is conceivable that the other end thereof may be sufficiently raveled in the bundle as to resist advancing movement. Accordingly, as a further feature of the invention, I provide means shiftable transversely of the billet supporting means or rails in timed relation to movement of the transfer means to comb a billet received by the transfer means out of the bundle. Thus, an upstanding member which may resemble the tooth of a comb, is normally positioned adjacent the transfer means and as the individual billet is lifted out of the bundle by the billet receiving member, it actually passes up and over the combing member which then starts its transverse movement. It will be appreciated that since the remote end of the billet is still in the bundle and at a lower level than the first end, the comb member eventually will engage the billet and force it in the direction of advance out of the bundle.

At this point it is important to realize that such action on the part of the combing member may cause the individual billet to tend to whip as it leaves the bundle. For this reason, I provide gating means adjacent the rail remote from the transfer means and operable to limit the advance of the adjacent end of the individual billet from the bundle under the influence of the comb member. When the billet is completely withdrawn from the bundle, the comb member returns to its original position, the gate shifting out of the way of the individual billet, so as to permit it to advance under the influence of the transfer means and a downward incline in the remote rail, and then returning to its normal position to obstruct advance of the bundle.

It will be appreciated that as the billet is being transferred by the transfer means, forces may be exerted upon it tending to shift it longitudinally, that is, perpendicular to the length of the rails, and thus to slip it out of engagement with the transfer means. In order to prevent this, a number of expedients may be utilized such as a vertical planar surface adjacent the remote rail to prevent such longitudinal shifting of the billets; but I prefer to provide clamp means pivoting with the transfer means and automatically clamping the billet being advanced and releasing it when the transfer member is retracted. The clamping means may be operated by a cam and follower if desired.

In order to supply a continuous feed for the transfer means, the bundle may be urged towards the transfer means by a spring bar, for example, and I may also use a bumping or jouncing beam acting on the bundle in advance of the transfer means. Or I may utilize a bumping walking beam which reciprocates from a position below to a position above the upper surface of the bundle supporting rails in advance of the transfer means and which has a forward translating movement on the up stroke. By this expedient, the bundle is jogged or jounced and at the same time repetitiously urged towards the transfer means so that an individual billet will always be in position for reception by the transfer member notch or recess.

To obviate the possibility of the transfer means picking up more than an individual billet, as may happen if several billets are badly raveled, an angular plate is positioned so that the individual billets in the recess of the transfer member will bearly clear beneath it, the plate thus serving as a wiper for wiping away any other billets which may tend to be brought along during the transfer action.

There has thus been outlined rather broadly the more important features of the invention in order that the detail description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not departt from the spirit and scope of the invention.

A specific embodiment of the invention has been chosen for purposes of illustration and description, and is shown in the accompanying drawings, forming a part of the specification, wherein:

FIG. 1 is a top plan view of apparatus in accordance with the present invention, and illustrating in phantom lines a billet being advanced from a bundle;

FIG. 2 is a cross-sectional view taken along the line 2—2 of FIG. 1;

FIG. 3 is an enlarged plan view of a portion of the apparatus illustrated in FIG. 1;

FIG. 8 is an elevational view illustrating an alternate means of advancing the bundle of billets toward the transfer means; and FIG. 9 is a fragmentary cross-sectional view taken along the line 9—9 of FIG. 8.

Figure 4:
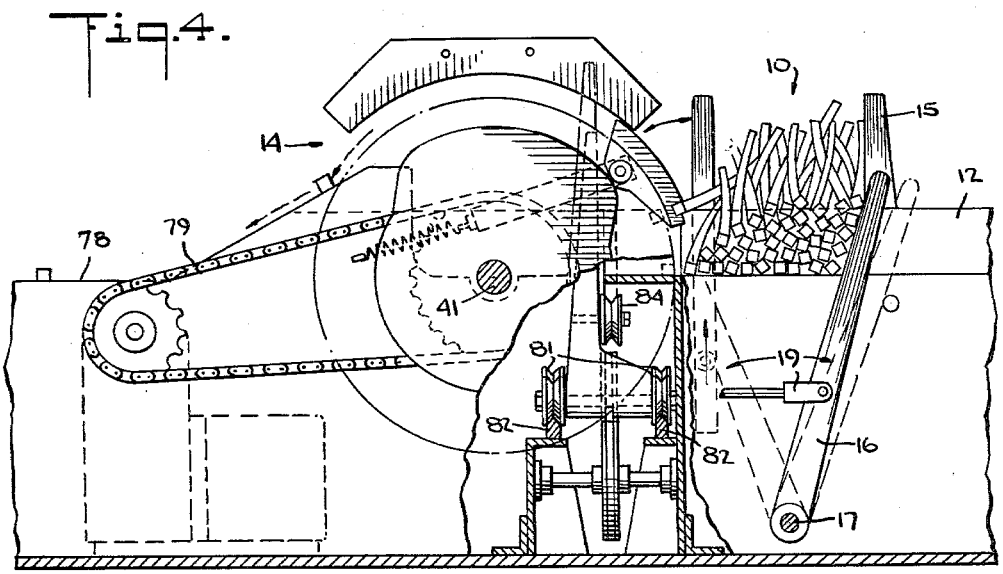
FIG. 4 is a cross-sectional view, partly broken away, taken along the line 4—4 of FIG. 1 and illustrating means for advancing the billets towards the transfer means.
Figure 5:
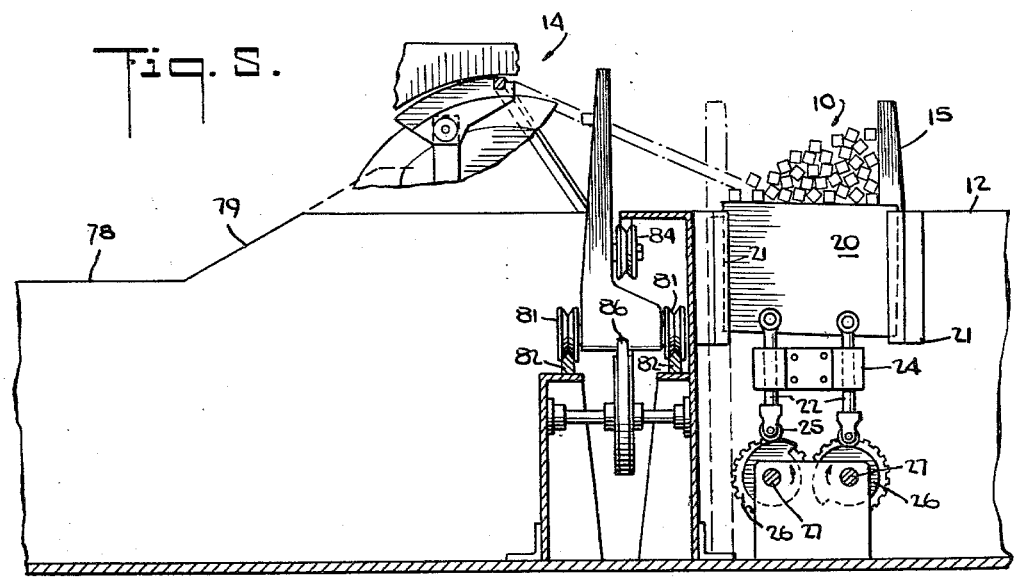
FIG. 5 is a cross-sectional view taken along the line 5—5 of FIG. 2.

Referring now to the drawings in detail, and particularly to FIGS. 1 to 3 thereof, there is shown a bundle 10 of billets positioned relatively to the apparatus for handling thereby to reduce the bundle down to individual billets.

The apparatus includes a U-frame 11 (FIG. 2), the arms 13 of which provide a pair of parallel, spaced-apart rails 12 which support the bundle adjacent its ends. As viewed, the right hand or remote rail, is at a higher level than its counterpart. As stated, the rails may be adjusted laterally relatively to one another, by any convenient means (not shown) to accommodate bundles of varying lengths.

Referring now to FIGS. 1, 2, 4 and 5, there are shown means affording a regular feed of billets to the transfer means, the latter being designated generally by the reference numeral 14. Thus, the bundle 10 is positioned on the rails 12 but in advance of stationary posts 15 which serve to keep the billets from tumbling back away from the transfer means 14. In FIGS. 1 and 4, there is shown a spring bar 16 pivoted at its lower end, as at 17, and urged in a counterclockwise direction thereabout, as viewed in FIG. 4 by means which may take the form of a spring, or a hydraulic or pneumatic ram 19. As shown, bar 16 extends upwardly beyond the level of the adjacent rail 12 so as to urge the bundle 10 to the left or towards the transfer means 14.

Simultaneously with the action of the bar 16, I may employ a jouncing action, and for this purpose I illustrate a pair of beams 20 (FIGS. 1 and 5) positioned respectively inboard of the rails 12 and guided for vertical movement by Z brackets 21 mounted on the U-frame 11 for the purpose. The beams 20 have rods 22 pivoted thereto and extending downwardly through brackets 24 loosely mounted for limited rocking movement. At the lower ends, the rods 22 have cam follower rollers 25 riding on stepped surfaces of cams 26 rotated in opposed directions, as indicated by the arrows in FIG. 5, by parallel shafts 27 supported in bearings 29 carried by brackets 30, and linked by gears 31 (FIG. 1). Either shaft 27 may be driven by any suitable means, and I show a wheel 32 on one shaft taking power through a belt 34 from the main drive 35 through reduction means 36.

From the description thus far, it will be seen that one end of the bundle 10 is constantly urged in a direction towards the transfer means, with no chance of any of the individual billets tumbling in the opposite direction, while the entire bundle is periodically jogged or jounced adjacent each rail to assist in unscrambling. For this purpose, it will be noted that the cams 26 (FIG. 5) are stepped 180° out of phase relatively to one another so that the beams 20 impart a fore and aft pitching movement to the bundle while jogging it. Additionally, it will be appreciated that one or more jogging beams may be positioned between those shown, if desired.

I shall now describe the transfer means 14, and for this purpose, reference will be had to FIGS. 1, 2 and 4 to 7. Thus, as best shown in FIGS. 1 and 2, the frame 11 has an extension 39 that includes a vertically disposed plate 40 parallel to the adjacent arm 13 of the U-frame, and a horizontal shaft 41 extends between this plate 40 and arm 13.

Figure 6:
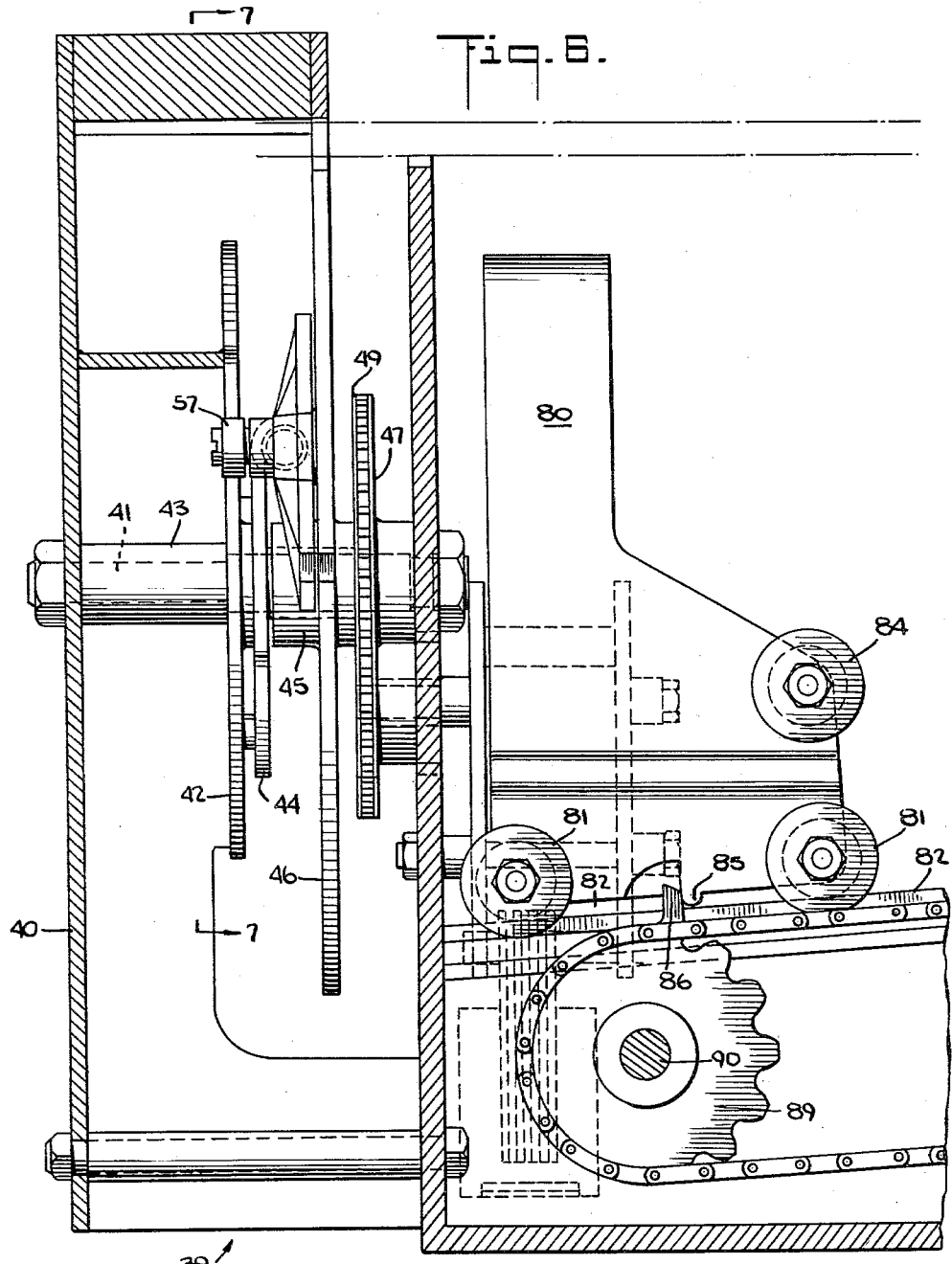
FIG. 6 is an enlarged view of portions of FIG. 2 illustrating certain details thereof.

FIG. 6 best illustrates the fact that the shaft 41 has a sleeve 43 adjacent the plate 40 and a pair of stationary cam plates 42 and 44 are mounted on the shaft adjacent the inner end of the sleeve 43 for a purpose later to be described. The shaft also has a collar 45 rotatable thereon, and this collar carries a plate or disc 46 and a sprocket wheel 47 by means of which it is driven about the shaft 41 by a chain 49. Referring momentarily to FIG. 1, it will be seen that the chain 49 takes its power from sprocket 50 on shaft 51 driven by motor 35 through reduction means 36.

Figure 7:
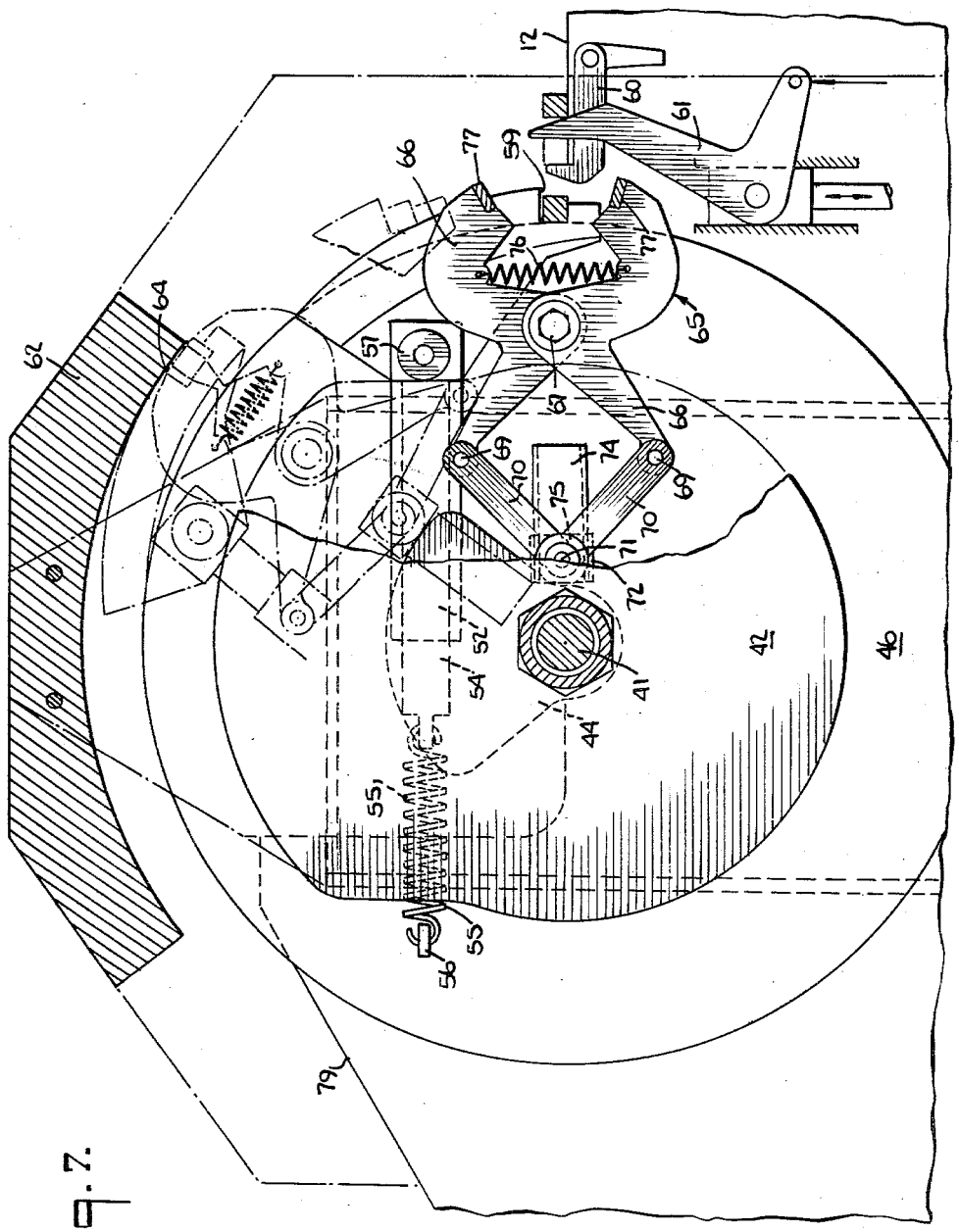
FIG. 7 is a cross-sectional view taken along the line 7—7 of FIG. 6.

As shown in FIG. 7, the rotating plate 46 carries a slide 52 which serves as a guide for slide bar 54 adapted to reciprocate therein. A tension spring 55 engages an end of the slide bar 54 at one end and a bracket 56 on the plate 46 at the other. The slide bar has a roller 57 mounted at its end opposite the spring 55, which roller engages the surface of the cam plate 42 (FIGS. 1, 2 and 7). The cam plate 42 is so contoured that in conjunction with the spring 55, it causes the slide bar 54 to reciprocate in the slide 52 at certain positions of the rotating plate 46, about which more will later be said.

At its free end, the slide bar 54 has an enlarged portion formed with a notch or recess 59 of a size and shape to receive a single billet. This enlarged portion may be interchangeable with the remainder of the bar, or the entire bar may be removed from the slide 52 in order to provide a notch or recess contoured for billets of different size or shape. In any case, the slide bar is projected by its cam 42 to receive in its recess 59 a billet from the rail 12. Actually, I may provide a gating mechanism in the form of a release bar 60 and pusher arm 61 timed with the rotation of the plate 46, and thus the slide bar 54, to release one billet at a time and block the passage of others to the recess 59.

A wiper 62 is provided with an arcuate contour 64 radiused about the axis of the shaft 41 and so positioned that the billet carried in the recess 59 will just clear beneath it. Thus, if for any reason, one or more other billets are caught on the enlarged portion of slide bar 54 or on the billet being carried, they will be wiped off and fall back into the bundle.

As I have mentioned, it is possible that, as a billet is being transferred, forces may be exerted upon it tending to shift it longitudinally, that is perpendicular to the length of the rails, thus to slip it out of engagement with the recess or notch 59. To prevent this, a vertical planar surface (not shown) may be positioned adjacent the end of the bundle remote from the transfer means; but as this expedient might not always prove satisfactory, as where a billet is effectively foreshortened by a large camber, for example, I prefer to utilize more positive means.

Accordingly, I provide a clamp 65 (FIG. 7) which is also carried by the rotating plate 46 and which may take the form of a pair of arms 66 formed of compound curves and pivoted to one another as at 67. The inner ends of the arms 66 are pivoted as at 69 to the respective outer ends of swivel arms 70, the inner ends of which are in turn pivoted to a common pivot 71 carried by a slide arm 72 in slide 74. This arm is provided with a cam roller 75, much the same as roller 57 already discussed, for movement along the surface of cam plate 44. The contour of plate 44 is such that when the slide 54 reaches that angular position at which it receives a billet, the slide 72 is urged outwardly causing swivel arms 70 to swing away from one another carrying the inner ends of arms 66 along with them, the same pivoting about the pivot 67 and causing the outer ends thereof to swing towards each other against the force of compression return spring 76. The faces of the clamp arms 66 may be equipped with tough rubber or plastic inserts 77 which actually grasp the billet in the notch 59 and secure it against longitudinal movement.

Now it will be apprecited that the transfer means is positioned adjacent one end only of the billets and, as has already been stated, it is conceivable that the other end thereof may be sufficiently raveled in the bundle as to resist separation thereof. Thus, I provide an upstanding member 80 (FIG. 6) that may resemble the tooth of a comb. This member has its bottom enlarged both in width (FIGS. 4 and 5) and in length (FIG. 6). Two pairs of grooved wheels 81 are mounted on the enlarged portion and ride on parallel rails 82 that extend across between the parallel arms 13 of the U-frame 11, and are inclined upwardly towards the rail 12 remote from the transfer means 14. A fifth grooved wheel 84 is provided at the forward end of the member 80 and above the lead wheels 81 for engagement with an overrail 83.

The member 80 is also equipped with a projection 85 that depends from the central part of its lower surface for engagement by an upstanding finger 86 carried by a chain 87 reeved about sprockets 89 on shafts 90 (FIG. 1). One of the shafts 90 is driven through pinions 91 and shaft 92 taking power from shaft 51 through bevel gears 94.

The member 80 is normally positioned adjacent the transfer means, at the lower end of the sloped rails 82, 83 and is of a height such that as a billet is taken from the bundle by the notched arm 54, it is lifted up and over the top of the member 80 by rotation of the plate or disc 46. The shaft 90 is so timed that when the billet clears the top of member 80, the finger 86 is brought into contact with the projection 85 and starts the member 80 moving along the sloped rails towards the remote end of the billets. Thus, as shown in FIG. 3, a billet in position A is first received in the notched slide 54 and is carried up and over member 80 to position B. Member 80 starts to move and engages the billet when it is in position C, the remote end of the billet still being raveled in the bundle 10. The member 80 now begins to exert a force on the billet pulling the raveled end free of the bundle, as in position D, thus in effect combing it out of the bundle.

The rails 82, 83 may be humped adjacent the remote arm 13 of the frame 11 so that as member 80 approaches that end of its excursion, it is lifted with the projection 85 to allow the finger 86 to pass beneath it, the member 80 then rolling by gravity back to its starting point.

It has been stated that the remote end of an individual billet may tend to whip as it leaves the bundle. For this reason I provide gating means 95 outboard of the remote rail 12 and shown in FIG. 1. This gating means may, for example, comprise a suitable driven and timed shaft 96 for rotating a crank 97 to which is pivoted one end a rod 99, the other end also being cranked as at 100. The crank 100 has a cam surface (not shown) beneath a bar 101 mounted for vertical reciprocating movement in guide 102. By proper timing, it will be appreciated that individual billets may be let out of the bundle while any whipping will be prevented by the bar 101 which then drops to allow the billet to pass.

After a billet is received in the notch 59 and is clamped between the arms 66, it is swung up and around beneath the arcuate surface 64 of the wiper plate 62. When the billet reaches a position about 45°, more or less, beyond the vertical, and is moving downwardly, its remote end having been acted upon by the member 80 and thus freed from the bundle, the contours of the cam plates 42 and 44 allow the slides 54 and 72, respectively, to retract under the influence of springs 55 and 76, respectively. Thus, the billet is released from the clamp and, as the arm 54 recedes, the edge surface of an inclined portion 79 (FIGS. 4 and 5) of the adjacent rail 12 acts as a stop causing the billet to be released from the notch 59 and to fall freely down along the surface 79 (FIGS. 1, 4, 5 and 7), and to a suitable conveyor 78, for example, well in advance of the bundle 10. Meanwhile the remote rail 12 is sloped downwardly so that as the transferred end slides down along the surface 79, the remote end slides down a similar surface or incline to the conveyor 83.

As an alternative to the spring bar 16 and jouncing beams 20, I illustrate in FIGS. 8 and 9 a billet advancing means in the form of a walking beam arrangement that might be used. Thus, adjacent each rail 12, I would position a beam 105 supported for vertical movement and for some longitudinal movement in guide members 106. As shown in FIG. 9, brackets 107 support bushings 109 for shafts 110 which rotate discs 111 intergral with the ends thereof. Each disc has an eccentric pin 112 extending outwardly from the front face thereof. The pins are seated in bushings 114 carried by the beams 105 for that purpose. When the shafts 110 are rotated in a counterclockwise direction, as viewed in FIG. 8, it will be seen that the pins will transmit movement to the beam 105 causing its upper surface to reciprocate from a position below to a position above the upper surface of the bundle supporting rails 12 in advance of the transfer means 14, while at the same time providing a translating movement on the upstroke in the direction of the transfer means 14. By this expedient, the bundle is jogged or jounced, and at the same time, it is repetitiously urged towards the transfer means so that an individual billet will always be in position for reception by the transfer member notch or recess 59.

In summary, the operation of the apparatus is as follows. When a bundle of beams is positioned transversely of the rails 12 in advance of the transfer means, the spring bar 16 and beams 20, or the beam 105, are actuated to advance the bundle toward the transfer means. If a gating means is used, as illustrated in FIG. 7, it is timed to permit the release of an individual billet into the recess 59 on the slide bar 54 and the billet is engaged by the pads 77 carried by the clamp 65, the slide arm 54 and clamp 65 being actuated by their respective cams 42 and 44 and followers 59 and 75. The billet is thus lifted in an annular path, passing under the wiping plate 62, and over the comb-like member 80 which is advanced toward the remote rail 12 by reason of engagement of the finger 86 against the projection 85.

As already explained, during the course of its excursion, the member 80 engages the billet and forces its remote end out of and away from the bundle, the member 80 also serving to prevent other billets from following, and the gate 101 preventing any serious whipping. This gate is now retracted to permit the individual billet to pass, the member 80 returns by gravity to its starting point, and the end of the billet engaged by the transfer means is released on the inclined surface 79, as the remote end reaches a similar inclined surface on the remote rail 12, the billet moving freely downwardly by gravity on these surfaces to any convenient conveying member.

From the foregoing description, it will be seen that I contribute to the art a simple and reliable billet handling apparatus utilizing support means for a bundle of billets to be separated and transfer means positioned intermediate the ends of the billets, the transfer means receiving individually billets in the bundle and operable to shift same from the bundle towards an advanced position on the support means, together with means shiftable transversely of the billet support means in timed relation to the movement of the transfer means to comb a billet received by the transfer means out of the bundle. It will also be seen that the present concept includes means for continuously advancing the bundle towards the transfer means to assure the handling of one billet per cycle of operation, as well as means for assuring that no more than one billet is handled in each cycle. I also contribute gating means for preventing damaging effects of whipping as the free end of a billet is combed out of the bundle.

I believe that the construction and operation of my novel apparatus for separating individual billets from bundles will now be understood and that the advantages of my invention will be fully appreciated by those persons skilled in the art.

I now claim:

1. In apparatus of the class described, spaced rails for supporting thereacross a bundle of billets to be separated, transfer means positioned adjacent one of said rails, said transfer means including a member formed to receive individually billets in said bundle, means projecting and retracting said member radially, means pivoting said member in timed relation to the radial movement thereof to advance the individual billet along said rails, said member receiving a billet when projected and releasing same when retracted, and means shiftable transversely of said billet support means in timed relation to movement of said member to comb a billet received by said transfer means out of said bundle.

2. In apparatus of the class described, spaced rails for supporting thereacross a bundle of billets to be separated, transfer means positioned adjacent one of said rails, said transfer means including a member formed to receive individually billets in said bundle, means projecting and retracting said member radially, means pivoting said member in timed relation to the radial movement thereof to advance the individual billet along said rails, said member receiving a billet when projected and releasing same when retracted, means pivoting with said member and engaging said billet being advanced to prevent longitudinal movement thereof relatively to said member, and means shiftable transversely of said billet support means in timed relation to movement of said member to comb a billet received by said transfer means out of said bundle.

3. In apparatus of the class described, spaced support means for supporting thereacross a bundle of billets to be separated, transfer means positioned adjacent one of said support means, said transfer means including means for receiving individually billets in said bundle and operable to shift same from said bundle towards an advanced position on said support means, means operative to actuate said transfer means, means reciprocable transversely of said billet support means in timed relation to movement of said transfer means to comb a billet received by said transfer means out of said bundle, and gating means adjacent the other of said rails positioned to prevent whipping of said individual billet and operable in timed relation to the movement of said combing means to allow said billet to advance from the bundle and to obstruct advance of said bundle upon reverse movement of said reciprocable means.

4. In apparatus of the class described, spaced parallel rails for supporting thereacross a bundle of billets to be separated, means for shifting said rails laterally relatively to one another whereby to enable same to accept bundles of billets of various lengths, transfer means positioned adjacent one of said support means, said transfer means including a member formed to receive individually billets from said bundle, cam means projecting and retracting said member radially to receive a billet when projected and release same when retracted, means pivoting said member in timed relation to the radial movement thereof to advance the individual billet along said rails, means pivoting with said member and engaging said billet being advanced to prevent longitudinal movement thereof relatively to said member, wiping means adjacent the path of said member to prevent movement therewith of additional billets, means urging said bundle towards said transfer means, means reciprocable transversely of said billet support means in timed relation to movement of said transfer means to comb a billet received by said transfer means out of said bundle, and gating means adjacent the other of said rails positioned to prevent whipping of said individual billet and operable in timed relation to the movement of said combing means to allow said billet to advance from the bundle and to obstruct advance of said bundle upon reverse movement of said reciprocable means.

5. In apparatus of the class described, spaced parallel rail means for supporting thereacross a bundle of billets to be separated, a member formed with means defining a recess for receiving individually billets in said bundle, means pivoting said member to shift an individual billet in said recess to an advanced position on said rail means, means projecting and retracting said member radially in timed relation to its pivoting movement, said member receiving a billet when projected and releasing same when retracted, and means shiftable transversely of said billet support means in timed relation to movement of said member to comb a billet received by said transfer means out of said bundle.

6. In apparatus of the class described, spaced parallel rail means for supporting thereacross a bundle of billets to be separated, a member formed with means defining a recess for receiving individually billets in said bundle, means pivoting said member to shift an individual billet in said recess to an advanced position on said rail means, means projecting and retracting said member radially in timed relation to its pivoting movement, said member receiving a billet when projected and releasing same when retracted, means pivoting with said member and operable to engage said billet being shifted to said advanced position to prevent longitudinal movement thereof relatively to said member, and means shiftable transversely of said billet support means in timed relation to movement of said member to comb a billet received by said transfer means out of said bundle.

References Cited by the Examiner

UNITED STATES PATENTS 1,854,943  4/32  Kunath _____ 221—219
2,718,316  9/55  Dickson.

HUGO O. SCHULZ, *Primary Examiner*.

ERNEST A. FALLER, JR., *Examiner*.